United States Patent [19]

Kendall

[11] Patent Number: 5,509,775

[45] Date of Patent: Apr. 23, 1996

[54] SELF LOADING CARGO VEHICLE

[75] Inventor: Donald H. Kendall, Almont, Mich.

[73] Assignee: The United States of America as represented by the Secretary of the Army, Washington, D.C.

[21] Appl. No.: 338,704

[22] Filed: Nov. 10, 1994

[51] Int. Cl.⁶ ........................................ B60P 1/14
[52] U.S. Cl. .................. 414/437; 414/494; 414/500
[58] Field of Search ............................ 414/482–485, 414/494, 500, 559, 538, 437, 439, 440

[56] References Cited

U.S. PATENT DOCUMENTS

| | | | |
|---|---|---|---|
| 680,979 | 8/1901 | Jacobs | 414/439 |
| 1,485,632 | 3/1924 | Shea | 414/439 |
| 1,561,157 | 11/1925 | Greer | 414/439 |
| 2,609,953 | 9/1952 | Schramm | 414/494 X |
| 4,321,004 | 3/1982 | Mills | 414/494 X |
| 4,645,405 | 2/1987 | Cambiano | 414/494 |

FOREIGN PATENT DOCUMENTS 8654   4/1908   United Kingdom .................... 414/494

Primary Examiner—David A. Bucci
Attorney, Agent, or Firm—Peter A. Taucher; David L. Kuhn

[57] ABSTRACT

A vehicle has a frame on which are mounted road wheels or a track. A cargo bed tilts on the frame about pivot mechanisms connected between the frame's aft end and a location on the bed remote from its ends. A spool on the frame rotates in response to road wheel or track rotation. A cable winds on the spool and around a pulley on the frame, passes through a slide block on the bed, fixes to a cargo module and pulls the module slidingly onto the vehicle during vehicle motion. The cable can later be removed from the pulley and connected directly to the cargo module, so that vehicle motion will now cause the cable to pull the module off the vehicle.

6 Claims, 5 Drawing Sheets

SELF LOADING CARGO VEHICLE

GOVERNMENT USE

The invention described here may be made, used and licensed by or for the U.S. Government for governmental purposes without paying me royalty.

BACKGROUND AND SUMMARY

The invention relates to military land vehicles that carry supplies to support combat forces in a theater of operations. More specifically, the invention relates to cargo vehicles that can be loaded with relatively large cargo modules without the assistance of heavy equipment such as hoists, cranes or special docks. These vehicles are useful for military logistical activities and combat support functions when such heavy equipment is inadequate, absent or destroyed.

My invention is a self-loading truck, trailer or similar vehicle having a unique design to serve the purposes outlined above. The vehicle has frame on which are mounted road wheels, a ground engagement track or a combination thereof. A cargo bed tilts on the frame via a pair of transversely spaced pivot members connected between the aft end of the frame and a location on the bed remote from its ends. A spool on the frame rotates in response to motion of the road wheels or track as the vehicle travels over the ground. A cable running from the spool winds around a pulley on the frame, passes through the bed's slide block, connects to the cargo module and pulls the module slidingly onto the vehicle during vehicle travel. For subsequent unloading, the cable can be removed from the pulley and connected directly to the cargo module, so that vehicle travel causes the cable to pull the module off the vehicle.

BRIEF DESCRIPTION OF THE DRAWINGS

FIG. 11 shows is a plan view of a slide block that mounts on the bed of the trailer.

FIG. 12 is an end view of the block shown in FIG. 11.

DETAILED DESCRIPTION

Figure 1:
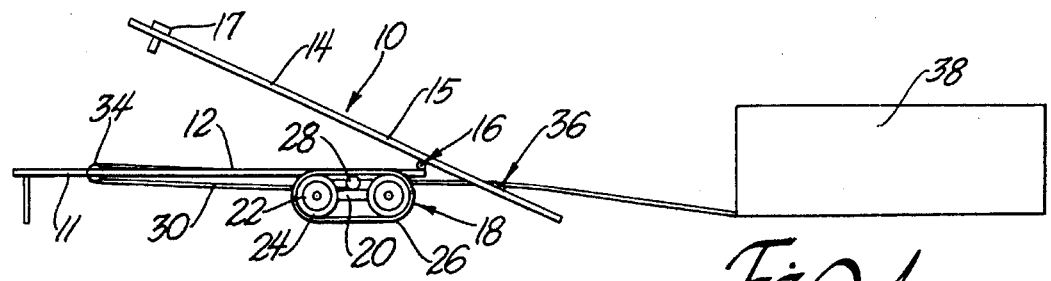
FIGS. 1, 2 and 3 are a series of side elevational views of a self-loading vehicle shown as a trailer connecting by a cable to a cargo module. The series of views shows the cargo module being pulled from an initial position on the ground to a final position where it is loaded on the trailer.
Figure 2:
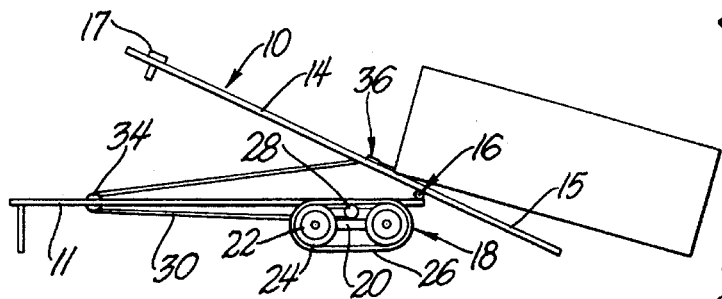
Figure 3:
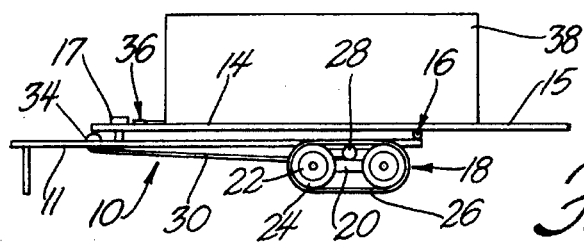

FIGS. 1 through 3 show in simplified form a self-loading trailer assembly 10 having a frame 12, a bed 14 and a pivot connection 16 therebetween which permits bed 14 to swing upon frame 12. It will be understood that trailer 10 can alternately be the load bearing portion of a truck or like automotive land vehicle. Pivot connection 16 is at a mediate zone 15 of the bed remote from the bed's fore and aft ends. Preferably, the mass distribution of bed 14 is at least roughly balanced with respect to connection 16, such that no more the weight of a person standing between zone 15 and the aft end of the bed is needed to tilt the bed to the FIG. 1 position. A suitable latch device 17 of conventional construction fixes upper bed 14 parallel to frame 12 after bed 14 is lowered to the FIG. 3 position. Frame 12 mounts on a ground engaging means such as track-wheel system 18, which comprises a walking beam 20, road wheels 22, tires 24 on the wheels and a flexible track 26 wrapped around the wheels.

Figure 4:
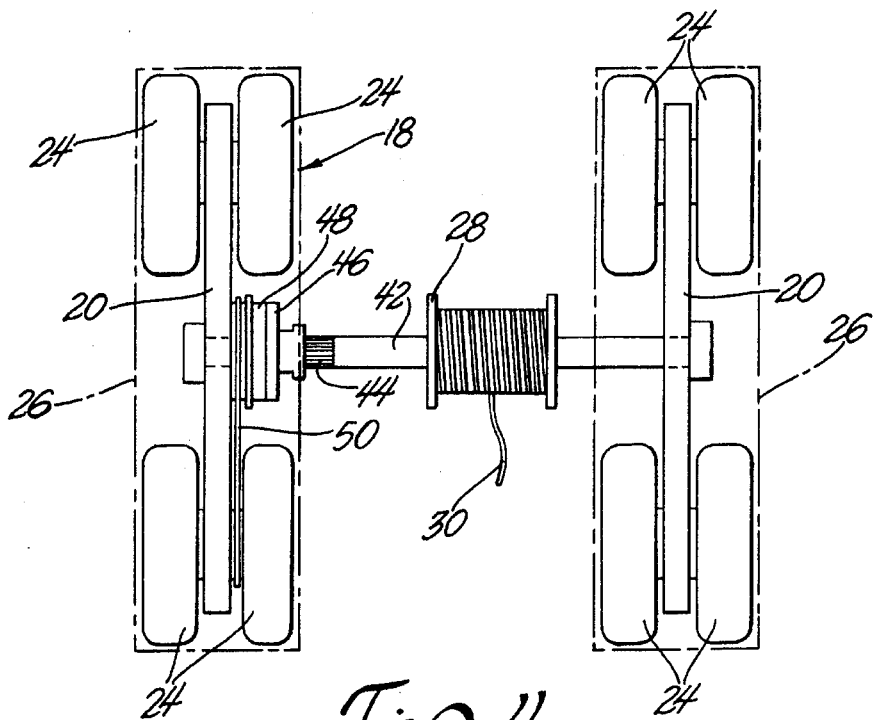
FIG. 4 is a plan view of a track-wheel system of the trailer shown in FIGS. 1 through 3.
Figure 5:
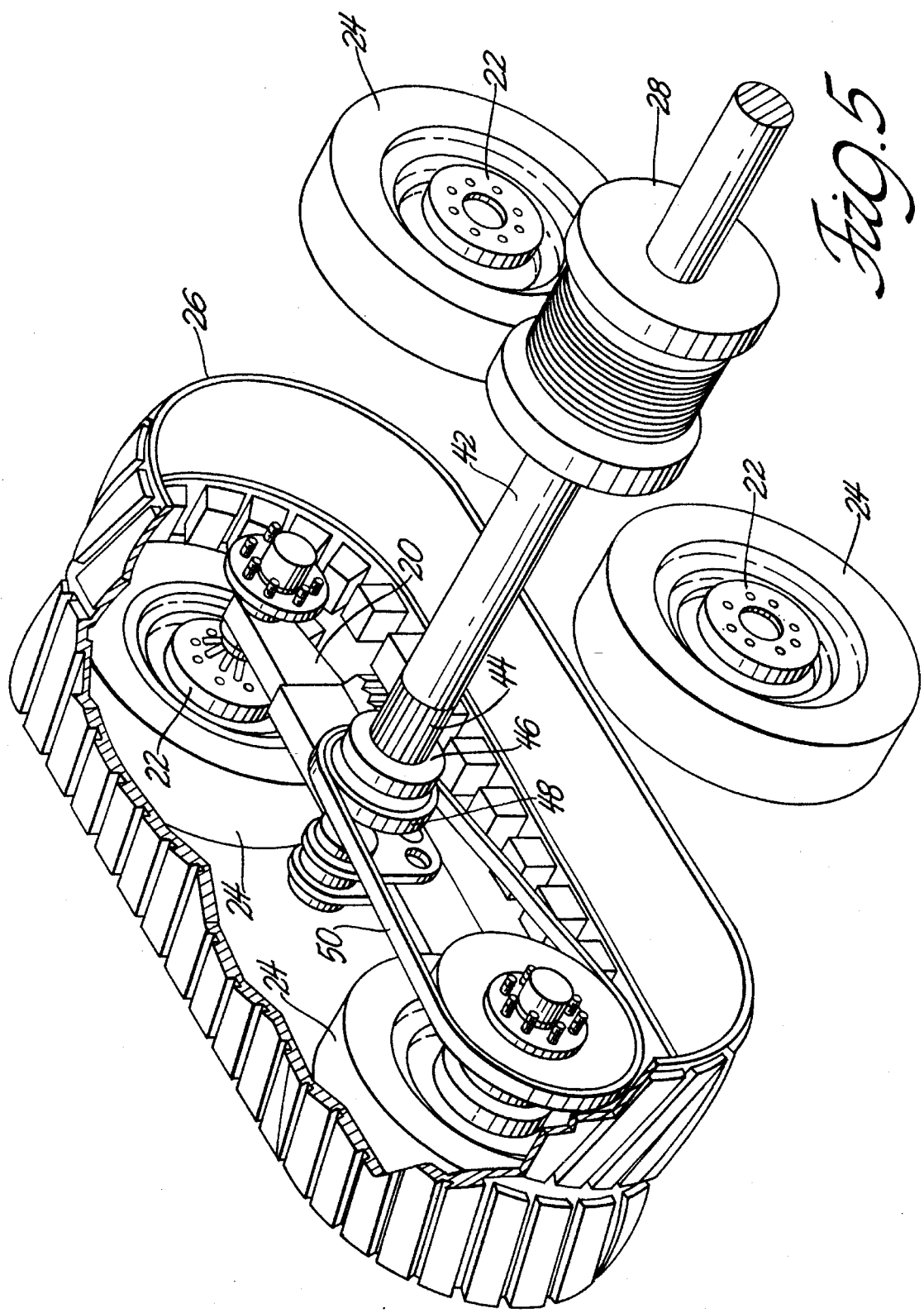
FIG. 5 is a partial, exploded view of the track wheel system showing some components in greater detail than FIG. 4.

A drum or spool 28, better shown in FIGS. 4 and 5, is driven by system 18 so that cable 30 winds onto spool 28 as trailer 10 rolls forward, or left in FIGS. 1 through 3. Cable 30 passes through slot 32 (FIG. 7) of frame 12, passes around pulley 34 at the frame's forward zone 11, through slot 40 (FIG. 8) of bed 14, through slide block 36 and finally fastens to cargo module 38. When trailer 10 rolls forward, cable 30 pulls cargo module 38 forward along slot 40 onto trailer 10 during the on-loading process shown by the progression of FIGS. 1, 2 and 3. Block 36 is keyed to slot 40 in the manner shown by FIG. 12 and is thereby retained on bed 14 as it slides forward along slot 40 from its FIG. 1 position to its FIG. 3 position.

Figure 15:
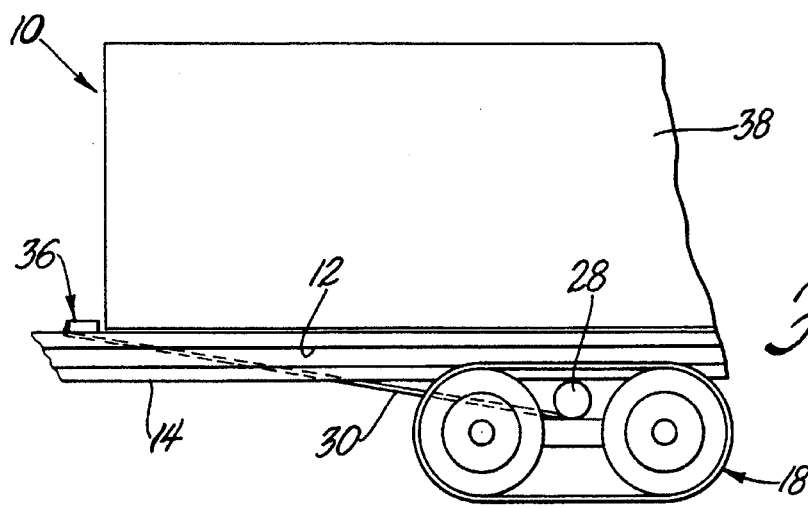
FIG. 15 is a partial side elevational view of the trailer as configured in preparation for off loading cargo module 38.

To off-load module 38 from trailer 10, cable 30 is first detached from module 38 and removed from pulley 34. Then cable 30 is attached directly to block 36, as by engaging hook 31 (FIG. 8) in hole 33 of block 36, and cable slack is eliminated by rolling trailer 10 forward with clutch member 46 engaged, so that cable 30 winds upon spool 28 until the slack is gone. Alternately, cable 30 can be hooked directly to cargo module 38 at the front end thereof. The configuration of cable 30 at this stage is shown in FIG. 15. As the trailer rolls further forward, cable 30 pulls module 38 backward until bed 14 tilts to its FIG. 2 position and module 38 slides to the ground to a position similar to that of module 38 in FIG. 2. As the trailer continues to roll forward, module 38 will be left lying on the ground in a position similar to that shown in FIG. 1.

FIG. 4 shows the drive connection between spool 28 and track-wheel system 18 wherein flexible track 26 is represented by dashed lines for convenience. FIG. 5 is a more detailed, exploded view of a portion of assembly 18 and its drive connection to the spool shown in FIG. 4. Spool 28 is fixed to axle 42 or a like journalled rotating member, and clutch member 46 axially slides on the axle's splined section 44 and turns therewith. Axle 42 is conventionally rotatably mounted to walking beams 20 so that axle 42, spool 28 and clutch member 46 all rotate together independent of walking beam motion. Journalled on axle 42 is rotator 48 turned by belt 50 that is driven by rotation of one of wheels 24. When clutch member 46 translates against rotator 48, the rotator turns member 46, axle 42 and spool 28 together so as to wind cable 30 onto spool 28.

Figure 6:
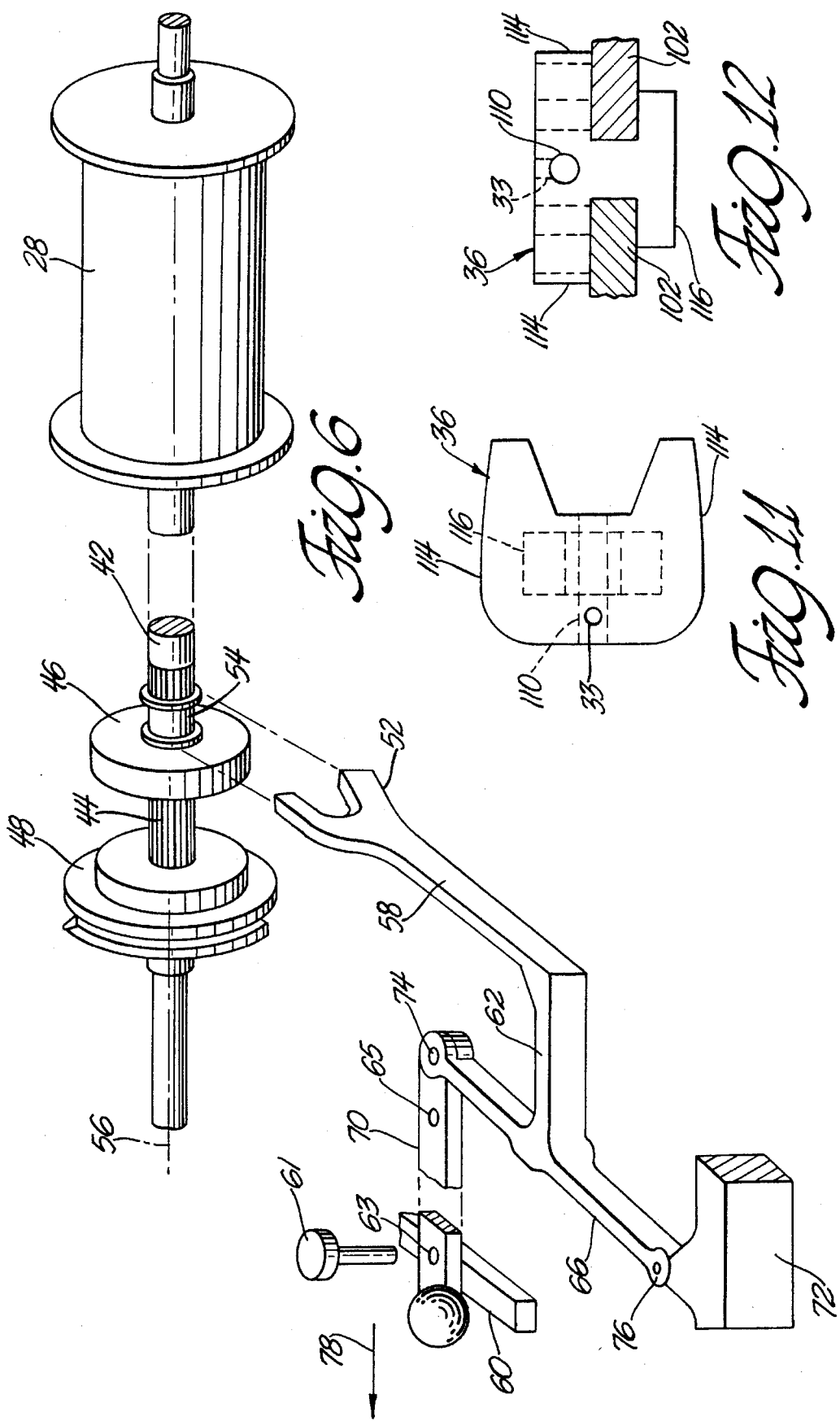
FIG. 6 is a perspective view of a clutching device for a cable spool of the trailer together with a typical mechanical linkage used to actuate the clutching device.

FIG. 6 is a mechanical linkage which can be used to actuate clutch member 44 wherein fork 52 engages collar 54 to translate clutch member along axis 56. Fork 52 integrally connects to a spring mechanism such as flexible arm 58, which in turn is fixed by rigid arm 62 to lever 66. The ends of lever 66 are hinged at joints 74 and 76 respectively to handle 70 and component 72, which component is fixed relative to trailer 10. Pulling handle 70 in direction 78 causes fork 52 to translate clutch member 46 into frictional engagement with rotator 48. Fork 52 is locked in a position to keep member 46 engaged to rotator 48 when pin 61 is inserted through hole 65 into component 60, which is fixed relative to trailer 10. The flexibility of arm 56 allows relative rotational slip between member 46 and rotator 48 when the attempted torque transfer between rotator 48 and axle 42 is above a selected value. Thus spool 28 can not be turned by motion of road wheel 22 if its resistance torque, caused by tension on cable 30, is too great. Note that fork 52 is locked in a position releasing member 46 from rotator 48 when pin 61 passes through hole 63 into component 60.

Figure 13:
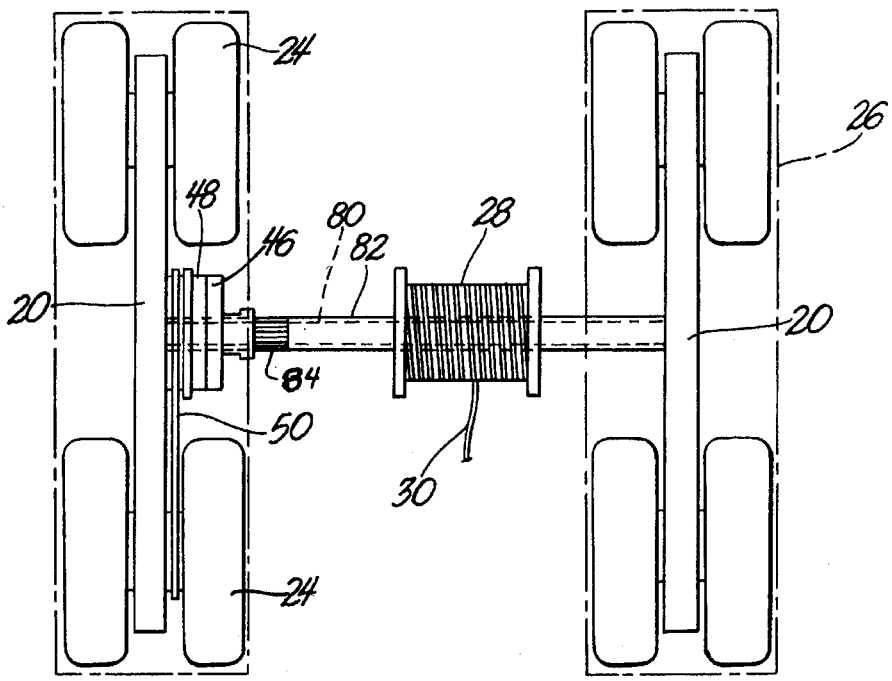
FIG. 13 shows an optional modification to the track-wheel system shown in FIG. 4.

FIG. 13 is a modification of the FIG. 4 structure wherein axle 80 replaces axle 42 of FIG. 4, and axle 80 is fixedly attached to walking beams 20, which thereby swing in concert. Spool 28 is fixed to sleeve 82, which rotates on axle 80. Clutch member 46 axially slides on the sleeve's spline 84 and rotates therewith, while rotator 48 is journalled on sleeve 82.

Figure 14:
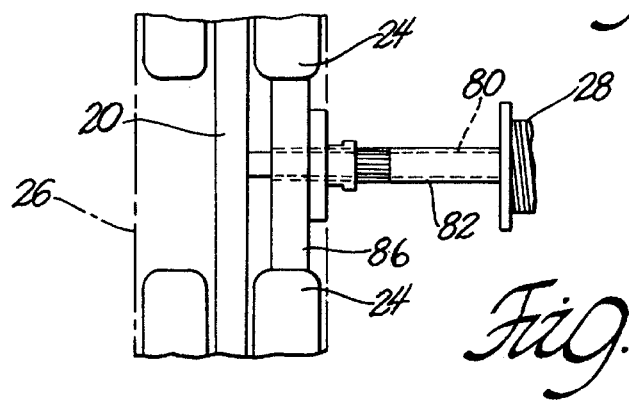
FIG. 14 shows an alternate modification to the track wheel system shown in FIG. 4.

FIG. 14 shows a further modification wherein drive transfer disk 86 replaces rotator 48 in FIG. 13. Disk 86 frictionally engages two tires 24 and is rotated by them, thereby obviating the need for belt 50.

Figure 7:
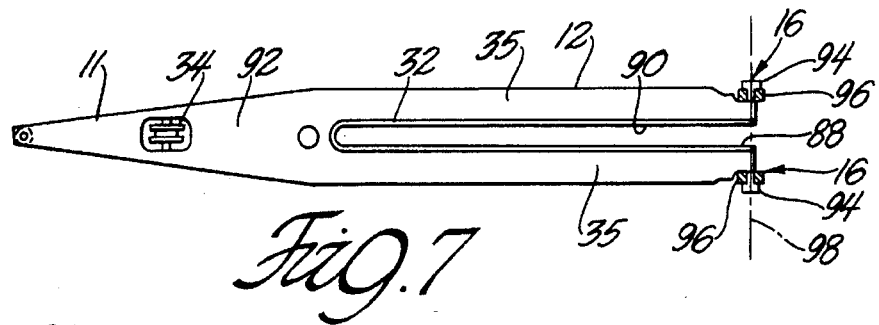
FIG. 7 is a plan view of the frame of the trailer.

From FIG. 7 it can be seen that frame 12 is a relatively narrow, elongate split platform. The frame defines slot 32 between bifurcation members 35 (FIG. 7) along a majority of its length, and the slot is open at aft slot end 88. Preferably, the slot has a bevel adjacent the upper face 92 of frame 12. Pivot connection 16 is shown as being comprised of a pair of headed axis pins 94 integral with frame 12, the pins being journalled in eye blocks 96 integral with trailer bed 14. A gap along axis 98 exists between the pair of pins 94 and the pair of blocks 96 to permit entry and exit of cable 30 into and from slot 32 as trailer 10 reconfigures between its FIG. 1 and FIG. 3 positions.

Figure 8:
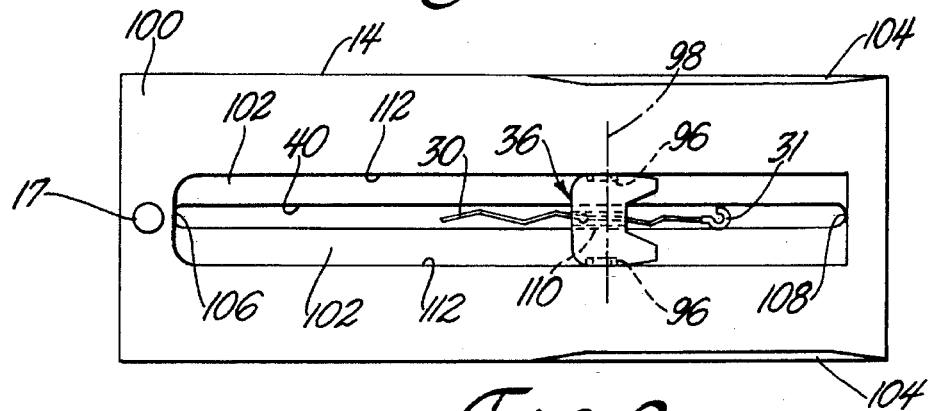
FIG. 8 is a plan view of the load bed for the trailer.
Figure 9:
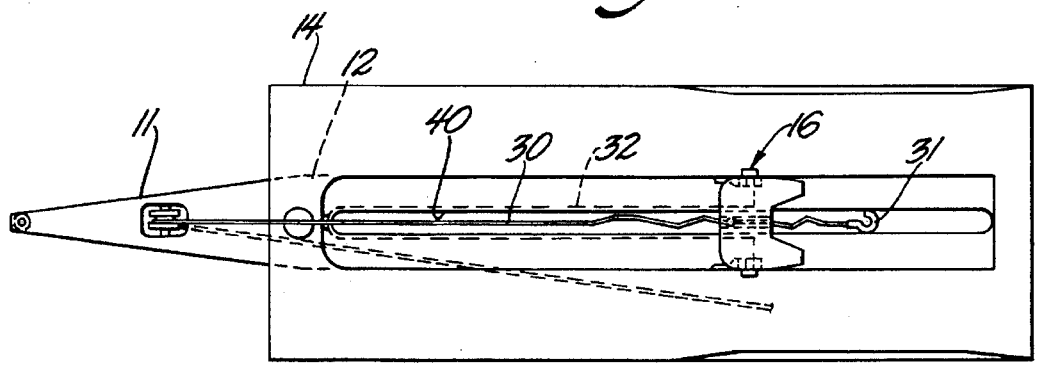
FIG. 9 is a plan view of the trailer frame with the trailer bed mounted thereon.

Referring now to FIG. 8, bed 14 has a smooth, flat cargo bearing face 100, two parallel elongate webs 102 recessed relative to face 100 and slot 40 bordered by the webs. Slot 40 is closed at fore end 106 and aft end 108 and typically extends 75% to 90% of the length of bed 4. As perhaps best seen in FIG. 9, part of slot 40 is disposed directly above slot 32, and part of slot 40 extends aft of slot 32.

Keyed to the webs and slidable therealong is block 36 defining bore 110 parallel to slot 40 through which passes cable 30. In some cases, it may be preferred that block 36 be flush with face 100 or recessed relative to this face. Sides 114 (FIG. 11) of the block contact and are guided by shoulders 112 between webs 102 and face 100. The block's flange 116 (FIGS. 11, 12) retains block in keyed relation to webs 102. A pair of guide rails 104 at the aft of bed 14 guide and retain cargo module 38 as it traverses along bed 14.

Figure 10:
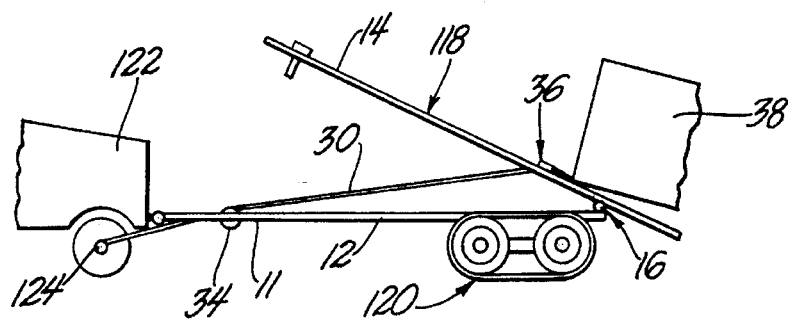
FIG. 10 shows an alternate embodiment of the trailer.

FIG. 10 shows an alternate embodiment 118 of trailer 10, trailer 118 being similar to trailer 10 except that track-wheel assembly 120 replaces assembly 18 of the original trailer 10, and cable 30 engages drive axle 124 of tractive vehicle 122 instead of assembly 18. Track-wheel assembly 120 is a conventional assembly, and lacks spool 28, spline section 44, clutch member 46, rotator 48 and belt 50, all of which are found in FIG. 4. When vehicle 122 drives forward, or left in FIG. 10, cable 30 winds upon axle 144 to pull module 38 forward relative to bed 14.

I wish it to be understood that I do not desire to be limited to the exact details of construction or method shown herein since obvious modifications will occur to those skilled in the relevant arts without departing from the spirit and scope of the following claims.

What is claimed is:

1. A land vehicle capable of on-loading or off-loading a cargo module, comprising: an elongate frame having a forward section and an aft end; a spool rotatably mounted to the frame; a cable attached to the spool; means engaged to a ground surface and connected to the frame for rotating the spool in response to travel of the vehicle over the surface, whereby the spool winds or unwinds the cable in response to travel of the vehicle;

an elongate bed;

a block slidable along the bed;

means on the block for engaging the cable;

two bifurcation members of the frame extending from the forward section to the aft end;

a frame slot defined by the frame between the bifurcation members, the slot being open at the aft end of the frame;

a bed slot defined by the bed, a first part of the bed slot being disposed directly over the frame slot and a second part of the bed slot extending aft of the frame slot;

a pulley at the forward section of the frame;

means for pivotally connecting the aft end of the frame to a location on the bed remote from the ends of the bed, wherein the connecting means comprises a pivot connection on each of the bifurcation members, the pivot connection on one bifurcation member defining a gap with the pivot connection on another bifurcation member.

2. The vehicle of claim 1 wherein a mass distribution of the bed is at least roughly balanced with respect to the pivot connection.

3. The vehicle of claim 1 wherein:

the block is keyed to the bed slot; and the engaging means comprises a through bore defined by the block and sized to accommodate the cable.

4. the vehicle of claim 1 wherein the rotating means comprises:

a road wheel on the trailer;

a drive connection between the road wheel and the spool;

a clutch means in the drive connection for selectively interrupting rotation of the spool in response to the travel of the vehicle.

5. The vehicle of claim 4 wherein the clutch means includes means for limiting torque transfer between the road wheel and the spool.

6. A vehicle capable of on-loading or off-loading a cargo module, comprising:

a frame having a forward section and an aft end;

two bifurcation members of the frame extending from the forward section to the aft end;

a frame slot defined by the frame and disposed between the bifurcation members;

a spool rotatable relative to the frame;

a bed tiltable from one position to another relative to the frame;

a bed slot defined by the bed, the bed slot disposed along the frame slot during the one position of the bed;

a block tracked to one of the slots and translating therewith while translating relative to another of the slots;

a cable engaging the spool and passing through the block, the cable translating relative to the block;

means for pivotally connecting the frame to a location on the bed remote from ends of the bed.

* * * * *